United States Patent
Dugan et al.

(10) Patent No.: US 7,340,443 B2
(45) Date of Patent: Mar. 4, 2008

(54) COGNITIVE ARBITRATION SYSTEM

(75) Inventors: Peter Dugan, Ithaca, NY (US); Lori K. Lewis, Owego, NY (US); Rosemary D. Paradis, Vestal, NY (US); Dennis A. Tillotson, Glen Aubrey, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 268 days.

(21) Appl. No.: 10/846,407

(22) Filed: May 14, 2004

(65) Prior Publication Data

US 2005/0256820 A1 Nov. 17, 2005

(51) Int. Cl.
- G06N 7/02 (2006.01)
- G06N 5/04 (2006.01)
- G06F 15/18 (2006.01)

(52) U.S. Cl. .............. 706/52; 706/8; 706/20; 706/46

(58) Field of Classification Search .............. 706/52
See application file for complete search history.

(56) References Cited

U.S. PATENT DOCUMENTS

| | | | |
|---|---|---|---|
| 4,449,189 A | 5/1984 | Feix et al. | |
| 5,197,004 A * | 3/1993 | Sobotka et al. | 705/8 |
| 5,463,696 A * | 10/1995 | Beernink et al. | 382/186 |
| 5,748,852 A | 5/1998 | Mahler | |
| 5,842,194 A | 11/1998 | Arbuckle | |
| 5,901,244 A | 5/1999 | Souma et al. | |
| 6,108,437 A | 8/2000 | Lin | |
| 6,137,896 A | 10/2000 | Chang et al. | |
| 6,304,833 B1 * | 10/2001 | Ferkinhoff et al. | 703/2 |
| 6,430,307 B1 | 8/2002 | Souma et al. | |
| 6,445,810 B2 | 9/2002 | Darrell et al. | |
| 6,526,161 B1 | 2/2003 | Yan | |
| 6,542,625 B1 | 4/2003 | Lee et al. | |
| 2002/0106114 A1 | 8/2002 | Yan et al. | |
| 2002/0113687 A1 | 8/2002 | Center, Jr. et al. | |
| 2002/0114464 A1 | 8/2002 | Wang | |
| 2002/0126880 A1 | 9/2002 | Dobashi | |
| 2003/0195793 A1 * | 10/2003 | Jain et al. | 705/10 |

OTHER PUBLICATIONS

Lin et al., Neuro Fuzzy Sytems, 1996, Prentis Hall, pp. 482, 601-602.*
J.F. Baldwin et al., Efficient Algorithms for Semantic Unification, 1996, Proceedings of IPMU.*
Boudraa et al., "Dempster-Shafer's Basic Probability Assignment Based on Fuzzy Membership Functions", 2004.*
Kurita, "Recognition and Detection of Occluded Faces by a Neural Network Classifier with Recursive Data Reconstruction", 2003.*
Argo et al., "Adaptive Security Systems—Combining Expert—Systems with Adaptive Technologies", 1997.*

* cited by examiner

*Primary Examiner*—Anthony Knight
*Assistant Examiner*—Nathan H. Brown, Jr.
(74) *Attorney, Agent, or Firm*—Tarolli, Sundheim, Covell & Tummino LLP

(57) ABSTRACT

A method and computer product is disclosed for arbitrating the outputs of a plurality of recognizers to select a hypothesis associated with a given input from a plurality of hypotheses. Fuzzy membership states are assigned to respective candidate outputs of the plurality of recognizers. At least one rule is selected according to the assigned fuzzy membership states. A selected rule provides a determined amount of support mass for an associated one of the plurality of hypotheses and a determined amount of uncertainty mass. A support value for each hypothesis and an overall uncertainty are determined from the provided mass values. A hypothesis having a highest support value while having an acceptable low level of uncertainty is selected.

22 Claims, 4 Drawing Sheets

COGNITIVE ARBITRATION SYSTEM

BACKGROUND OF THE INVENTION

1. Technical Field

The present invention relates generally to pattern recognition and classification and more specifically to systems and methods for arbitrating the results of multiple recognizers

2. Description of the Prior Art

Pattern recognition systems, loosely defined, are systems capable of distinguishing between various classes of real world stimuli according to their divergent characteristics. A number of applications require pattern recognition systems, which allow a system to deal with unrefined data without significant human intervention. By way of example, a pattern recognition system may attempt to recognize individual letters to reduce a handwritten document to electronic text. Alternatively, the system may recognize spoken utterances to allow verbal commands to be received at a computer console. In order to classify real-world stimuli, however, it is necessary to train a recognizer to discriminate between classes by exposing it to a number of sample patterns.

In many applications, it is difficult or impossible to train a recognizer on all of the possible classes of patterns that can occur during operation. For example, in a face recognition application operating in a public location, it is impossible to train a recognizer to recognize all of the millions of individuals who could conceivably be encountered by the recognizer. With a very real possibility that the recognizer can encounter stimuli from an unknown class in a given situation, it becomes important to distinguish accurate recognizer results from false positives, in which the recognizer assigns an existing class to a stimuli belonging to an unknown class. In many applications, these false positives can cause a large degree of inconvenience and expense.

SUMMARY OF THE INVENTION

To this end, a method, in accordance with an embodiment of the present invention, is provided for arbitrating the outputs of a plurality of recognizers to select a hypothesis associated with a given input from a plurality of hypotheses. Fuzzy membership states are assigned to respective candidate outputs of the plurality of recognizers. At least one rule is selected according to the assigned fuzzy membership states. A selected rule provides a determined amount of support mass for an associated one of the plurality of hypotheses and a determined amount of uncertainty mass. A support value for each hypothesis and an overall uncertainty are determined from the provided mass values. A hypothesis having a highest support value is selected from the plurality of hypotheses.

In accordance with another aspect of the present invention, a computer program product, fixed in a computer-readable medium and operative in a data processing system, arbitrates the outputs of a plurality of recognizers to select a hypothesis associated with an input from a plurality of hypotheses. At least one fuzzy class assignor assigns fuzzy membership states to respective candidate outputs of a plurality of recognizers. A rule selector evaluates a plurality of rules according to the assigned fuzzy membership states to determine which of the plurality of rules apply to each of the plurality of output hypotheses. An applicable rule provides a determined amount of support mass for an associated hypothesis and a determined amount of uncertainty mass. A data fusion module determines a support value for each hypothesis and an overall uncertainty value from the provided mass values and selects a hypothesis having a highest support value.

In accordance with yet another embodiment of the invention, a system for classifying an input into one of a plurality of output classes comprises a plurality of pattern recognizers. A given recognizer selects at least one of the plurality of output classes and assigns respective output scores to the selected at least one output class. At least one fuzzy class assignor assigns fuzzy membership states to the respective candidate outputs of the plurality of recognizers. A rule selector evaluates a plurality of rules according to the assigned fuzzy membership states to determine which of the plurality of rules apply to each of a plurality of output hypotheses. An applicable rule provides a determined amount of support mass for an associated hypothesis and a determined amount of uncertainty mass. A data fusion module determines a support value for each hypothesis and an overall uncertainty value from the provided mass values and selects an output class associated with a hypothesis having a highest support value.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE DRAWINGS

Figure 1:
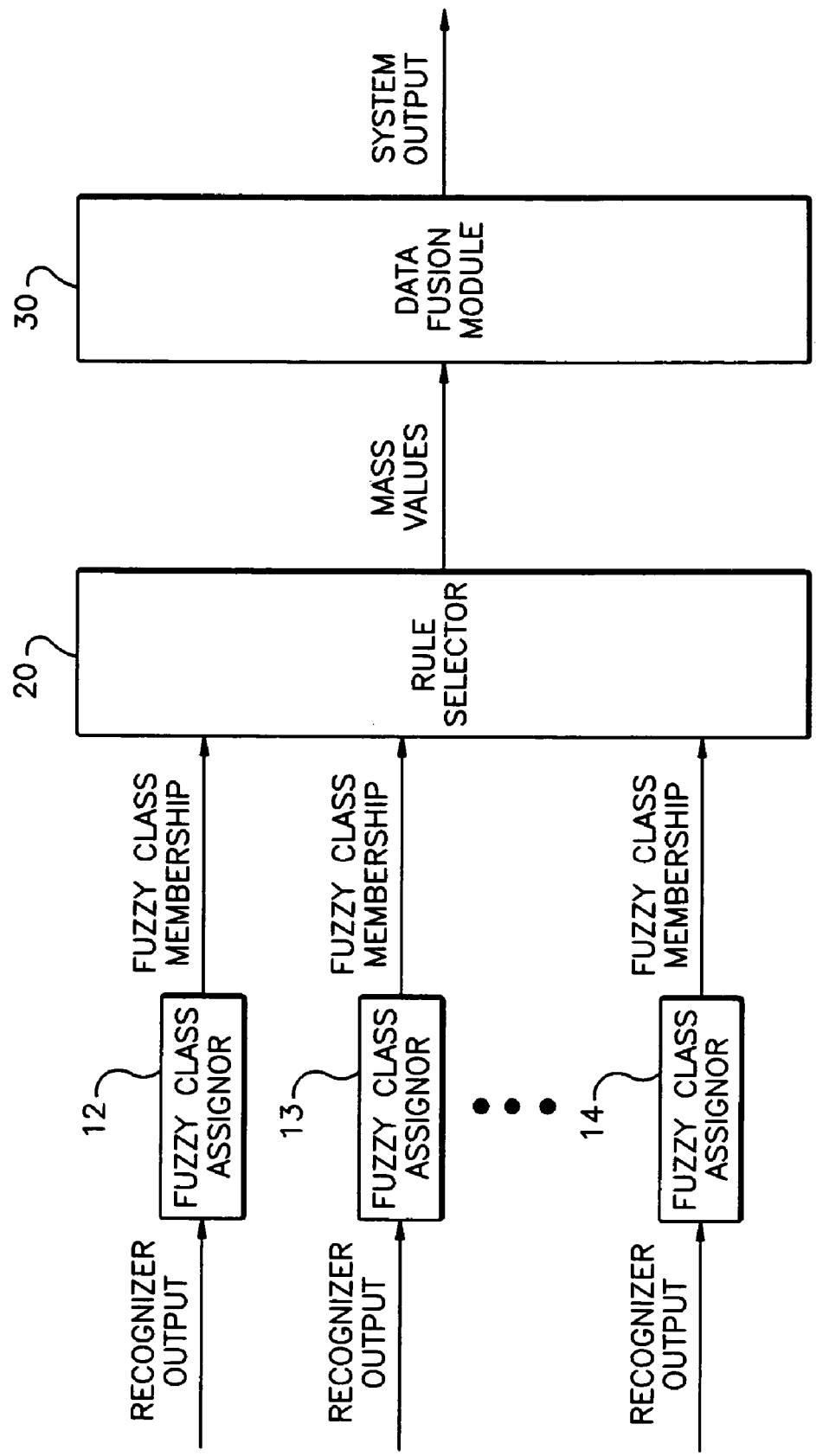
FIG. 1 illustrates a flow diagram illustrating a cognitive arbitration system in accordance with an aspect of the present invention.

FIG. 1 illustrates a flow diagram illustrating a cognitive arbitration system in accordance with one aspect of the present invention. The cognitive arbitration system operates to assign confidences to a correct hypothesis but extends classical probability theory, to further reduce the likelihood of false positives. This improvement is a result of accounting for uncertainty that exists between the outputs of the various recognizers. Uncertainty measures are used to determine whether or not the hypothesis with the maximum confidence should be considered as a viable answer.

The illustrated arbitration system receives the outputs of N recognizers, where N is an integer greater than one. A given recognizer can provide one or more candidate outputs, each candidate output including a selected hypothesis and an output score. In one implementation of the present invention, the output score includes a confidence value indicating the likelihood that the selected class is accurate. The candidate outputs can be ranked according to their associated output scores. The recognizers can comprise any of a variety of automated decision-making systems, including neural networks, support vector machines, statistical pattern recognition classifiers, fuzzy logic systems, data fusion routines, rule or case based systems, or other suitable algorithmic programs.

It will be appreciated that the illustrated arbitration system and its associated recognizers can be implemented as computer programs, executable on one or more general purpose computers. Accordingly, any structures herein described can be implemented alternately as dedicated hardware circuitry for the described function or as a program code stored as part of a computer-assessable memory, such as a computer hard drive, random access memory, or a removable disk medium (e.g., magnetic storage media, flash media, CD and DVD media, etc.). Functions carried out by the illustrated arbitrator, but not helpful in understanding the claimed invention, are omitted from this diagram. For example, a system implemented as a computer program would require some amount of working memory and routines for accessing this memory. Such matters are understood by those skilled in the art, and they are omitted in the interest of brevity.

It will further be appreciated that when implemented as a computer program product, the cognitive arbitrator can interact with other software program modules. For example, the cognitive arbitrator can run within a computer operating system environment, utilizing data libraries available from the operating system. Similarly, the arbitrator can receive data from one or more other program modules, such as one or more recognizers implemented in software, and provide data to other program modules that utilize the arbitrator output. Furthermore, the arbitration system can reside on a remote computer system, whereby various recognizers can be linked via a computer network such and WAN, LAN, optical communication media, public switched telephone network, the global packet data communication network now commonly referred to as the Internet, any wireless network or any data transfer equipment offered by a service provider.

The outputs of the recognizers are provided to respective fuzzy class assignors 12-14. A given fuzzy assignor convert the output score associated with each candidate output generated by its associated recognizer into probability distribution functions represented by fuzzy class membership designations. For example, the various output scores from a given recognizer can be placed into one of a plurality of fuzzy membership grades such as "very high," "acceptable," "close," and "not acceptable." Other fuzzy membership classes can be utilized, based on the application. It will be appreciated that the assignment of fuzzy class memberships can be performed at the recognizers to simplify the implementation of the arbitration system.

The output class determinations from each recognizer and their associated fuzzy classifications are provided to a rule selector 20. The rule selector 20 utilizes the fuzzy classification determinations to assign support mass to each of the plurality of hypotheses according to a plurality of arbitration rules. For example, the rule selector 20 can assign varying amounts of mass to a given hypothesis in response to a candidate output associated with the hypothesis, the ranking of the determined class at the recognizer, and the associated fuzzy classification for the candidate output. Rules can also be based on candidate outputs from multiple recognizers as well, with the mass associated with the rule applied to a given hypothesis only when all of the conditions of the rule are met.

The determined support from the rule selector 20 is provided to a fusion module 30. The fusion module 30 determines a final hypothesis according to the determined mass. In an exemplary implementation, the fusion module 30 uses the determined support as belief in a Dempster-Shaffer analysis, with the mass provided by each rule providing an associated amount of support and uncertainty for a given hypothesis. The support values for each rule applying to a given hypothesis are combined, for example, by taking the product of the support values. Similarly, the uncertainty generated for a given hypothesis is combined by the same means. The support for each hypothesis and the total uncertainty across all of the hypotheses are then compared, with the hypothesis having the largest overall support being selected. The selected hypothesis can be accepted as a system output. Alternatively, all classes can be rejected if no support value is sufficiently large or the uncertainty level is unacceptably high.

Figure 2:
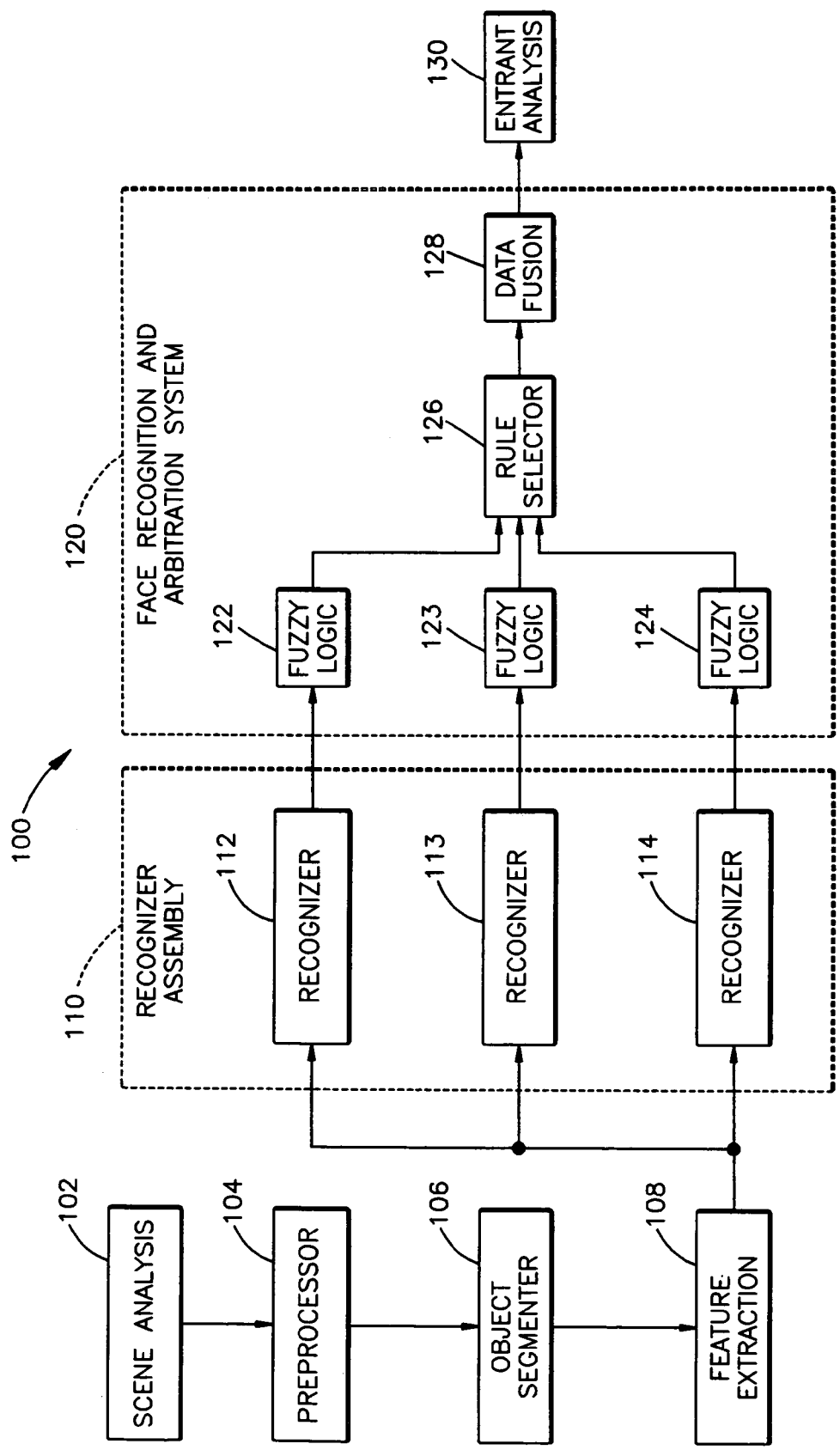
FIG. 2 illustrates a video surveillance system incorporating an exemplary cognitive arbitration system in accordance with an aspect of the present invention.

FIG. 2 is a functional block diagram of an exemplary implementation of a cognitive arbitration system in accordance with the present invention as part of a video surveillance system. In the example embodiment, the video surveillance analysis system of the present invention is used to monitor the entry points of a secured location. The exemplary cognitive arbitration system is implemented as part of a face recognition system that identifies entrants to the secured location. It will be appreciated, however, that a cognitive arbitration system in accordance with the present invention can be implemented in any of a number of applications, both inside and outside the field of pattern recognition, including other arbitration tasks in the described scene surveillance system 100.

The system 100 begins at a scene analysis portion 102. The scene analysis portion 102 receives inputs from a number of video cameras (not shown) located at entryways and other important locations within the secured area. For example, a camera can be trained on a ticket counter within the airport or at a boarding area. The scene analysis portion 102 analyzes the video footage for motion or long-term changes. Where either is found, the selected footage is passed to a preprocessing portion 104. The time of day, location, and lighting conditions can also be determined from the captured footage.

At the preprocessing portion 104, the video footage is separated into individual frames and sample frames are selected for processing. These sample frames are further prepared by producing alternate copies of the images, such as grayscale or binarized images to facilitate further analysis. The preprocessed frames are then passed to an object location portion 106, where the frames are searched for objects of interest, such as faces. Other objects of interest can also be identified for later analysis, such as hair and torso portions of an entrant, and objects carried by the entrant, such as bags, suitcases, purses, or briefcases. The object location portion 106 uses several specialized algorithms for identifying faces and other objects of interest. The height and weight of the object, of a person, is then calculated and values assigned to a fuzzy interval, and associated with the person. This fuzzy weight and height interval is also used in the analysis as an aid to false negative and false positive prevention.

In an exemplary implementation, the specialized segmentation algorithms identify a body area of an individual, a face area of an individual, a hair area of an individual, and any items (e.g., handbags, luggage, briefcases, etc.) carried by the individual. An exemplary segmentation algorithm can sample the color of the grayscale of a video frame into an image of a lower compression. At lower compression, the image tends to have large contiguous areas that can be clustered. The algorithm looks for groupings of identical grayscale values and groups them together into runs. These runs of grayscale values are clustered into two-dimensional blocks. The system uses the size, location, position in the frame and aspect ratio of the blocks to divide them into hair, face, baggage, and body areas and sort them from the rest of the image. This can be done one particular implementation where the frame was taken from a static camera image. When a shape is detected resembling an object of interest, the portion of the image containing the shape is removed from the frame and saved as a separate image file. These images are then classified into their appropriate groups: hair, not hair; bag, not bag; face, not face, etc. by a number of other classifiers. The positive outputs are then classified again into sub-classes of the object, for example, backpacks, carry-on luggage, or gym bags.

Any identified faces are provided to a feature extractor 108 that extracts feature data from the image of the face. Any other identified objects of interest can be provided to various other evaluation and classification systems (not shown). The feature extractor 108 extracts feature values from each image according to a set of selected features. The selected features can be any values derived from the pattern that vary sufficiently among the various output classes to serve as a basis for discriminating among them. Numerical data extracted from the features can be conceived for computational purposes as a feature vector, with each element of the vector representing a value derived from one feature within the pattern. Features can be selected by any reasonable method, but typically, appropriate features will be selected by experimentation and prior success.

The extracted feature vector is then provided to a recognizer assembly 110. At the recognizer assembly 110, the feature vector is provided to a plurality of recognizers 112-114. At each recognizer (e.g., 112), the feature vector is compared to training data from a number of output classes. The training data can represent the faces of a number of entrants that the recognizer assembly 110 has been trained to recognize. The recognizers attempt to match the feature vector to one or more of a plurality of represented classes using the selected classification technique. In this process, one or more candidate output classes are selected and corresponding output scores are calculated. For example, the output scores can represent confidence values for the recognizer associated with the selected output class. Where multiple candidate output classes are selected, they can be ranked at the recognizer (e.g., 112) according to their associated output scores. Any of a variety of recognizer architectures and techniques can be utilized at the recognizers for making this determination. For example, the recognizers 112-114 can be implemented as support vector machines, self-organized maps, fuzzy logic systems, data fusion processes, expert systems, rule, case based systems, or algorithmic programs, or any of a variety of neural network classifiers.

For example, one recognizer (e.g., 112) can be implemented as an autoassociative neural network (AANN). An AANN contains a plurality of nodes, each node being connected to at least one other node by one or more interconnections. Each interconnection between nodes is weighted, with the weights being determined according to training data. An AANN is trained to recognize one or more known training patterns and respond with an output vector indicating a matching training pattern and the similarity of the received feature vector to the indicated pattern.

Once each of the plurality of recognizers has determined one or more candidate output classes for the feature vector and computed corresponding output scores, the classification value and output class for each recognizer is provided to a face recognition and arbitration system 120 at respective fuzzy class assignors 122-124. The fuzzy class assignors 122-124 assign fuzzy membership classes to the output of their respective recognizers 112-114. For example, the output score from each recognizer (e.g., 112) can be used to assign fuzzy membership classes to their respective output classes, such as "very high," "appropriate," "close," and "not appropriate."

The assigned fuzzy membership classes are then utilized at a rule selector 126 to select one or more rules for each of a plurality of hypotheses, representing potential output classes for the arbitration system 120. Each rule that is selected and meets any defined criteria adds support for the given hypothesis. If an output class is selected as part of a candidate recognizer output, it can potentially provide support for a hypothesis associated with the output class. The degree of support provided by the candidate outputs is determined by a plurality of rules. A given rule includes one or more conditions that can be met by the candidate outputs. In an exemplary embodiment, the conditions can be based on the ranking and fuzzy class membership of the candidate outputs associated with a given class at each recognizer. When a rule is selected for a given hypothesis and its associated output class, it provides a predetermined amount of support for that hypothesis and a contribution to the overall uncertainty. In an exemplary embodiment, the rules can be assigned priority values that serve as weights for the provided mass. The relative importance of the various rules, or the various rules themselves when used for different circumstances, can be changed by an operator by redefining the priority values.

The selected rules are then provided to a data fusion module 128. At the data fusion module 128, the mass from the rules selected for each hypothesis is combined to form an overall support value for the hypothesis, and the uncertainty values associated with the selected rules can be combined to produce a contribution to overall uncertainty for the hypothesis. In an exemplary embodiment, the support for each hypothesis is calculated by multiplying the mass from each selected rule together to form a first product and the uncertainty from each selected rule is multiplied together to form a second product. The first product provides a support value for the hypothesis, and the second product is added to an overall uncertainty for the system. Finally, the support from all of the hypotheses is normalized to determine a belief for each hypothesis.

In an exemplary embodiment, the belief for each hypothesis is the ratio of its associated support to the sum of the uncertainty and the support for all of the hypotheses. A normalized uncertainty can be determined in a similar manner. A plausibility range can then be determined for each hypothesis, with the belief for the hypothesis forming the lower bound and the sum of the belief and the normalized uncertainty forming the upper bound. The hypothesis with the largest belief value can be selected as the output of the system. The result can also be filtered to reduce false positives. For example, one of the belief or maximum plausibility for the selected hypothesis can be compared to a threshold value. If the threshold is not met, the system 120 can produce a negative output indicating that the analyzed face is not present in the system.

The output of the face recognition and arbitration system can then be passed an entrant analysis module 130. The entrant analysis module 130 determines an appropriate system reaction according to the identified face and any other information produced from objects of interest within the system. A score can be calculated for each entrant according to the results of the face classification and any other image data. For example, if the recognizers cannot recognize an individual's face, it might output a small value or zero. Where the face is recognized as an employee, a moderately large positive value can be outputted. Any other classification systems available in the system 100 can contribute in a similar fashion, with low or negative scores awarded for output classes indicating an abnormal condition. These values are multiplied by predetermined weights and summed to achieve a score.

The weights will vary with the application, but generally the results from the face recognition will be heavily weighted as compared to the other recognizers. In a similar vein, results concerning features that are easily mutable, such as hair color will be lightly weighted. The intention of summing the scores in this manner is to discourage false positive and false negative matches in the individual recognition systems. The summed output can be evaluated on a scale having multiple thresholds. An individual who scored above a first threshold value could be considered to be a non-threat by the system, while an individual scoring below a second threshold value may trigger an alarm condition within the system. An individual scoring between the two threshold values will be considered a possible threat, and can trigger an alarm condition of a reduced level.

The thresholds can be set as to allow the mistaken output of any classification to be overridden by the outputs of the other classification. For example, even where an individual's face is not recognized, the first threshold is set such that an individual who does not trigger an output indicating an abnormal situation in the other recognizers can obtain a score meeting the first threshold. Thus, an unrecognized individual whose height, weight, and hair color match his or her ID and who is not carrying anything suspicious might meet the first threshold.

The determined score at the entrant analysis module 130 can control the system response to an entrant. For example, a visible or audible signal can be provided to a human operator indicating the video surveillance camera recording the abnormal activity. In a particularly sensitive secured area, an alarm can notify operators who are not on the scene or produce a generally audible alarm signal. Multiple levels of response are possible, depending on the score achieved by an entrant. In the example embodiment, where an entrant's score falls below the second threshold, an operator can be notified by both a visible and an audible alarm, or the system might trigger further security involvement and surveillance. A score falling between the two thresholds might result merely in a text notification appearing at a computer monitor.

Figure 3:
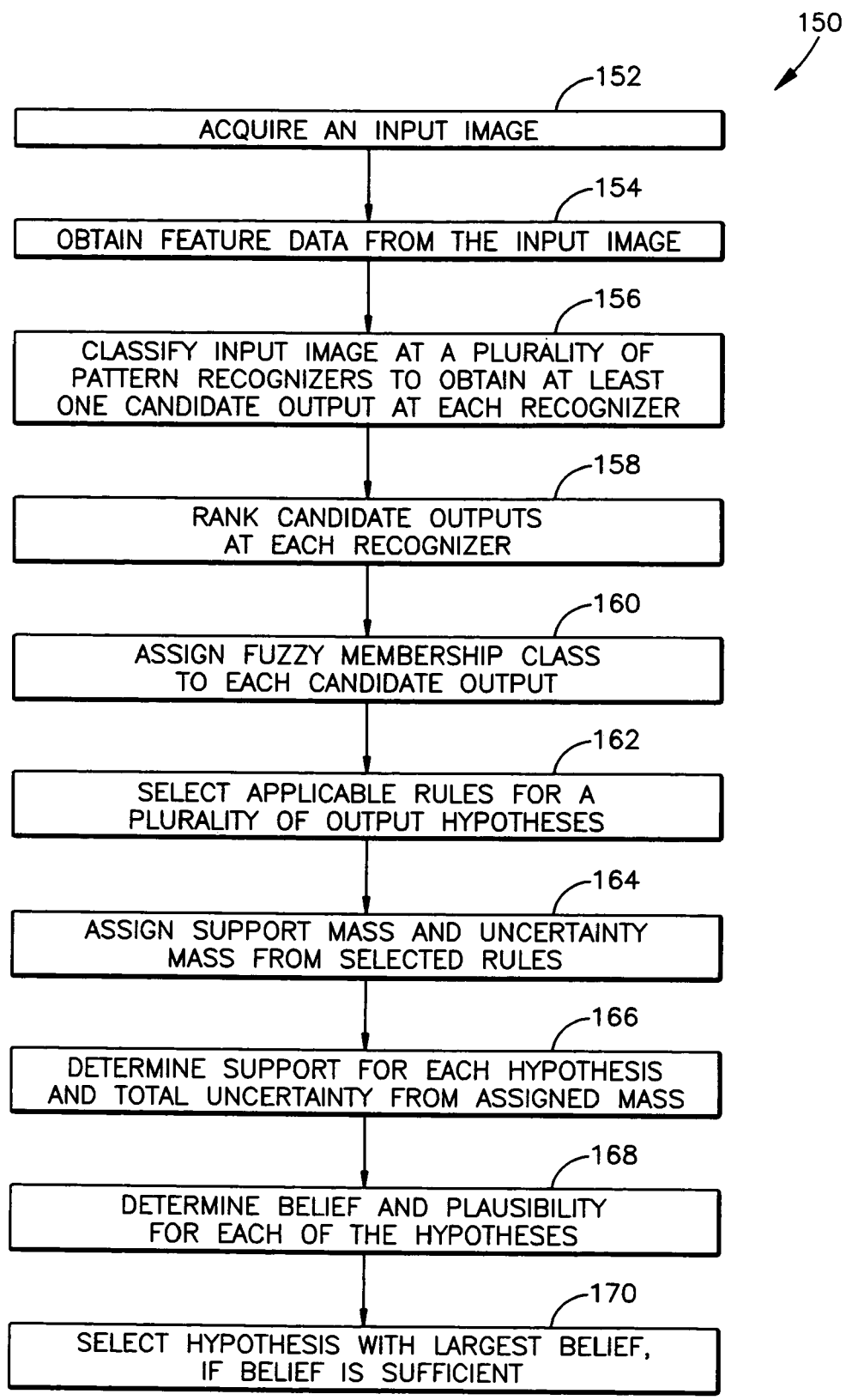
FIG. 3 illustrates a flow diagram illustrating an exemplary pattern recognition system utilizing a cognitive arbitration process in accordance with an aspect of the present invention.
Figure 4:
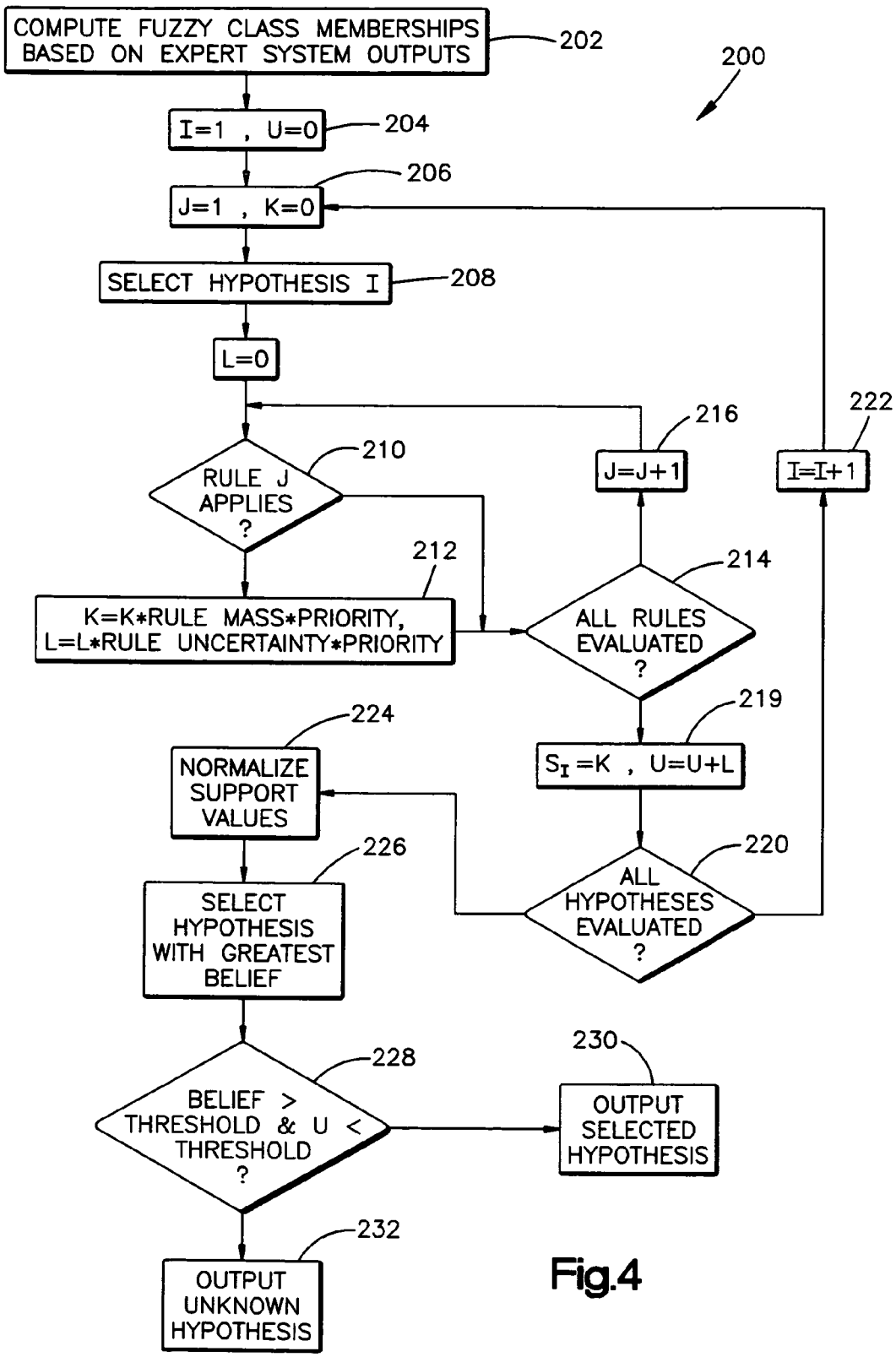
FIG. 4 illustrates a flow diagram illustrating the operation of an exemplary cognitive arbitration system in accordance with an aspect of the present invention.

In view of the foregoing structural and functional features described above, methodologies in accordance with various aspects of the present invention will be better appreciated with reference to FIGS. 3-4. While, for purposes of simplicity of explanation, the methodologies of FIGS. 3-4 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

FIG. 3 illustrates a flow diagram 150 depicting the operation of an exemplary pattern recognition system in accordance with the present invention. The method 150 begins at step 152, where an input image is acquired. For example, a digital camera can acquire an image of a desired subject as digital image data comprising one or more of brightness, hue, and saturation values for a plurality of pixels. At step 154, feature data is extracted from the digital image data according to a plurality of desired features. For example, an exemplary feature can include the average pixel brightness across of a defined region of the image. It will be appreciated that different classification schemes can utilize varying image features.

At step 156, the extracted feature data is provided to a plurality of pattern recognizers. Each recognizer determines one or more candidate output classes for the input image according to the extracted feature data to obtain at least one candidate output associated with one of the plurality of output classes. The classification at each recognizer can be accomplished by any of a variety of classification techniques, including, for example, distance-based statistical classification, neural network classifiers, support vector machines, self-organized maps, fuzzy logic, data fusion, expert systems, rule or case based systems, or algorithmic programs. During the classification, an associated confidence value is determined for each of the candidate outputs, reflecting the likelihood that the input image selected candidate output. This confidence value is determined by the previous success rates of the particular recognizer, or the confidence in the particular method itself. More proven methods may be given a higher confidence value, not necessarily because of the more correct output than another method, but because it has been used in more examples and has proven to generate appropriate outputs.

At step 158, the candidate output classes at each recognizer are ranked according to their associated output scores. At step 160, a fuzzy membership class is assigned to each of the candidate outputs, reflecting an indicated degree of membership in the associated output class. For example, the assigned fuzzy membership classes can include a "very high" membership class, indicating a high degree of class membership, an "appropriate" membership class, indicating a reasonable degree of class membership, and a "not appropriate" class, indicating an unacceptable degree of class membership. The assignment of the fuzzy membership class can be envisioned as an expansion of the confidence value into a probability distribution function represented by the assigned class. These fuzzy class values can be broken down into any number of well-defined and discriminating classes. For example, a scale might range as follows: tall, average, short. If appropriate, a more discriminating scale can be used, such as very tall, moderately tall, average, moderately short, and very short. This range would be a more discriminating range, but the inputs would also have to be able to be discriminated to this level of detail.

At step 162, at least one rule from of a plurality of rules, which may vary for each application, is selected according to the ranking of the candidate objects and the assigned fuzzy membership classes. Each of the plurality of rules has one or more conditions that can be satisfied by characteristics of the recognizers' candidate outputs. The candidate outputs associated with each of plurality of hypotheses can be evaluated to select any applicable rules for each hypothesis. When a rule is selected for a given hypothesis, it contributes a certain amount of support mass and a certain amount of uncertainty mass to a given hypothesis.

At step 164, the associated support mass and uncertainty mass are assigned according to the rules selected for each hypothesis. A support value for each hypothesis and a total uncertainty for the classification can then be determined at step 166. For example, the support mass values associated with all of the rules for a given hypothesis can be multiplied together to create a total support for that hypothesis. Similarly, the uncertainty mass for the selected rules can multiplied together to create a contribution to the uncertainty for that hypothesis. The rules can be weighted by defined priority values to determine the relative importance of the rules.

Once uncertainty contributions for the plurality of hypotheses have been calculated, they can be summed across the hypotheses to produce a total uncertainty for the classification of a given object. Therefore, the more matches that agree between a given set of recognizers, the smaller the uncertainty measure, and the more likely the system will be to find the correct match. The more conflict between match results between recognizers, the higher the uncertainty, and the more likely the system will be to find a false positive match.

The various support values and the uncertainty values can be normalized at step 168 to determined belief and plausibility values for the hypotheses. The belief for each hypothesis is equal to the ratio of the support for that hypothesis to the collective sum of the support for all of the hypothesis and the uncertainty. The plausibility for each hypothesis is equal to the difference between one and the collective belief of the other hypotheses.

Once the belief values have been calculated, the hypothesis, and its associated output class, with the largest belief can be selected at step 170. To avoid false positive classifications, the selected hypothesis can be rejected if its associated belief is below a threshold value and the uncertainty value is considered high. Therefore, belief measures along with uncertainty measures are evaluated to ensure enough information is gathered to make a decision. The more belief in a given hypothesis forces the uncertainty to be relatively small, the more conflict between hypotheses, allows for higher level of uncertainty.

FIG. 4 illustrates a flow diagram 200 depicting the operation of an exemplary cognitive arbitration system in accordance with the present invention. The method begins at step 202, where fuzzy memberships are computed for the output of each of a plurality of recognizers. In the exemplary system, each recognizer provides a plurality of candidate outputs comprising a selected hypothesis and an associated output score. Each unique hypothesis selected by the recognizers becomes one of a plurality of output hypotheses considered by the system. It will be appreciated that the same hypothesis can be selected at multiple recognizers, and thus multiple candidate outputs can be associated with each output hypothesis.

Each of the candidate outputs is assigned a fuzzy membership in one of a plurality of fuzzy classes representing a degree of membership associated with the selected hypothesis. For example, the fuzzy classes can range from a "not acceptable" class for very low confidence candidates to a "very high" class for high confidence candidates. The candidate outputs are also ranked at each recognizer according to their respective associated output scores.

The method 200 then advances to step 204, where a counter, I, for the plurality of output hypotheses is initialized to select a first hypothesis and an uncertainty mass, U, is initialized to zero. The plurality of hypotheses can be arranged in a random order for evaluation or be ordered according to a desired characteristic (e.g., output confidence). The method then advances to step 206, where a rule counter, J, is initialized to select a first rule from a plurality of available rules, a hypothesis support value, K, is initialized to one, and a hypothesis uncertainty value, L, is initialized to one.

The method then advances to step 208, where an $I^{th}$ hypothesis is selected. The method then advances to step 210, where it is determined if a $J^{th}$ rule applies to the selected hypothesis. A given rule will have one or more requirements to be met by one or more candidate outputs associated with the selected hypothesis, and provides a predetermined amount of mass to the hypothesis as well as an uncertainty mass to an overall uncertainty when the requirements are met. For example, a rule can require that the selected hypothesis be associated with the highest ranked candidate output at two or more recognizers and require the associated candidate outputs to have a desired degree of fuzzy class membership. The masses provided by each rule can be further weighted by respective priority values. These priority values can be adjusted by an operator to change the relative importance of each rule in the arbitration. The rules can also be added to or modified as necessary. Appropriate masses and priority values for the rules can be determined through experimentation.

If it is determined that the rule applies to the selected hypothesis (Y), the method advances to step 212, where the hypothesis support, K, is multiplied by the rule mass and the priority value for the rule to combine the mass with any existing support mass for the hypothesis. The hypothesis uncertainty value is multiplied by the uncertainty mass and the priority value for the rule. Since the uncertainty mass generated by each rule is generally significantly smaller than the support mass, the selection of a new rule and its associated multiplications have the effect of exponentially increasing the ratio of support mass to uncertainty mass for a given hypothesis. The method then advances to step 214. If it is determined that the rule does not apply to the selected hypothesis (N), the method advances directly to step 214.

At step 214, it is determined if all of the rules have been evaluated for the selected hypothesis. If not all of the rules have been evaluated (N), the method proceeds to step 216, where the rule counter, J, is incremented, and then returns to step 210 to evaluate the next rule. In one implementation, a new hypothesis can be created while evaluating the rules. This can be accomplished, for example, by using a NULL hypothesis, representing a situation where a match not found in a database associated with the recognizers. In this case the uncertainty measure may be trivial and need not be evaluated. In some systems, uncertainty in this case may be important whereby low uncertainty for the NULL hypothesis indicates that an exhaustive search of the data has been performed. If all of the rules have been evaluated (Y), the method advances to step 219. At step 219, the belief values associated for the given hypothesis is saved and the uncertainty combined with the overall uncertainty. More specifically, the hypothesis support value, K, is saved as a hypothesis support, $S_I$, and the uncertainty value, L, is added to the total system uncertainty, U.

The method then advances to step 220, where it is determined if all of the plurality of hypotheses have been evaluated. If not all of the hypotheses have been evaluated (N), the method proceeds to step 222, where the hypothesis counter, I, is incremented, and then returns to step 206 to evaluate the next hypothesis. If all of the hypotheses have been evaluated (Y), the method advances to step 224.

At step 224, the support values for the arbitration are normalized to determine the overall belief for each hypothesis. In the normalization, a total support is calculated as the sum of all of the hypothesis support and the system uncertainty. The ratio of each hypothesis support to the total support represents the belief associated with each hypothesis. An uncertainty for the arbitration can be determined as the ratio of the total uncertainty to the total support. The method then advances to step 226, where the hypothesis having the highest belief is selected.

At step 228, the belief value of the selected hypothesis and the overall uncertainty are compared to respective threshold values. If the belief exceeds a first threshold and the uncertainty value falls below a second threshold (Y), the method advances to step 230 where the selected hypothesis is provided as an output for the arbitration system. The method then terminates. If the belief does not exceed the threshold or the uncertainty value is too high (N), the method advances to step 232 where an unknown hypothesis, indicating that the input is not associated with a known hypothesis of the arbitration system, is provided as an output. The method then terminates.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim the following:

1. A machine, having a memory comprising data representing a plurality of hypotheses and associated support values for the plurality of hypotheses, the data being a product of a process comprising the steps of:
    generating candidate outputs, representing an input pattern, at a plurality of recognizers;
    assigning fuzzy membership states to respective candidate outputs of the plurality of recognizers;
    selecting at least one rule according to the assigned fuzzy membership states, a selected rule providing a determined amount of support mass for an associated one of the plurality of hypotheses and a determined amount of uncertainty mass;
    determining a support value for each hypothesis and an overall uncertainty value from the provided mass values;
    comparing the support value for the selected hypothesis to a first threshold value;
    comparing the overall uncertainty value to a second threshold value;
    accepting the selected hypothesis if the support value meets the first threshold and the overall uncertainty value is below the second threshold value; and
    outputting a negative result if the selected hypothesis is not accepted.

2. A machine as set forth in claim 1 wherein the step of determining a total support value for a given hypothesis includes multiplying the associated support masses for a plurality of selected rules associated with the hypothesis to form a support value and multiplying the associated uncertainty mass for the plurality of selected rules associated with the hypothesis to form an uncertainty value.

3. A machine as set forth in claim 2 wherein computing the overall uncertainty value includes summing the uncertainty value associated with each hypothesis across the plurality of hypotheses.

4. A machine as set forth in claim 2 wherein each rule has an associated priority value and the associated mass for the rule is weighted by the priority value.

5. A machine as set forth in claim 4, wherein the associated priority values of the plurality of rules are configurable by a user to adjust the relative importance of each rule.

6. A machine as set forth in claim 1 wherein the each of the plurality of recognizers produces a plurality of candidate outputs, each associated with one of the plurality of hypotheses and ranked by associated output scores, and the at least one rule is selected according to the assigned fuzzy membership states and the ranking of the candidate outputs.

7. A machine as set forth in claim 1 wherein at least one of the plurality of recognizers includes a pattern recognition classifier, and a given hypothesis is associated with an output class of the at least one pattern recognition classifier.

8. A machine as set forth in claim 1, the process further comprising the step of normalizing the support values and the overall uncertainty to a desired scale.

9. A machine as set forth in claim 8, the process further comprising the step of computing a plausibility range for each hypothesis from the normalized values.

10. A computer-readable medium operative in a data processing system, that stores executable instructions for arbitrating the outputs of a plurality of recognizers to select a hypothesis for a given input from a plurality of hypotheses, the executable instructions comprising:
    a fuzzy class assignment routine that assigns a fuzzy membership state to respective at least one candidate outputs of the plurality of recognizers;
    a rule selection routine that evaluates a plurality of rules according to the assigned fuzzy membership states of the candidate outputs to determine which of the plurality of rules apply to each of the plurality of output hypotheses, an applicable rule providing a determined amount of support mass for an associated hypothesis and a determined amount of uncertainty mass; and
    a data fusion routine that determines a support value for each hypothesis and an overall uncertainty value from the provided mass values, normalizes the support values for the plurality of hypotheses to determine associated belief and plausibility values for each of the plurality of hypotheses, and selects a hypothesis having a highest support value;
    such that a general purpose processor can execute the executable instructions stored on the computer readable medium to select a hypothesis for a given input from a plurality of available hypotheses.

11. A computer readable medium as set forth in claim 10 wherein the plurality of hypotheses include output classes associated with at least one recognizer.

12. A computer readable medium as set forth in claim 10 wherein the data fusion routine outputs a negative hypothesis, indicating that an appropriate hypothesis cannot be selected for the input, if the determined belief for the associated hypothesis fails to meet a threshold value and the uncertainty level is high.

13. A computer readable medium as set forth in claim 10 wherein a given recognizer produces a plurality of candidate outputs and ranks the candidate outputs according to associated output scores.

14. A system for classifying an input pattern into one of a plurality of output classes comprising:
    a memory comprising executable instructions, the executable instructions comprising:
        a plurality of pattern recognition routines, a given pattern recognition routine selecting at least one of the plurality of output classes and assigning respective output scores to the selected at least one output class;

at least one fuzzy class routine that assigns a fuzzy membership state to the selected output classes of the plurality of pattern recognition routines;

a rule selection routine that evaluates a plurality of rules according to the assigned fuzzy membership states to determine which of the plurality of rules apply to each of a plurality of output hypotheses, an applicable rule providing a determined amount of support mass for an associated hypothesis and a determined amount of uncertainty mass; and a data fusion routine that multiplies the associated support masses for a plurality of selected rules associated with each hypothesis to form a support value for the hypothesis and multiplying the associated uncertainty mass for the plurality of selected rules associated with each hypothesis to form an uncertainty value for the hypothesis and selects an output class associated with a hypothesis having a highest support value; and a processor for executing the executable instructions as to classify the input pattern into one of the plurality of output classes.

15. A system as set forth in claim 14 wherein the plurality of output class represent human faces.

16. A system as set forth in claim 14 wherein the plurality of pattern recognition routines includes a neural network classifier.

17. A system as set forth in claim 14 wherein the input pattern comprises a video input recording at least one entrant to a secured location.

18. A system as set forth in claim 17 wherein the classification system determines the identity of a given entrant to the secured location from the video input.

19. A system as set forth in claim 18 wherein the input image is analyzed relative to an entrant profile associated with the identified entrant to determine if an abnormal condition exists.

20. A system as set forth in claim 19, wherein the entrant profile includes the typical time of entry and place of entry by an entrant to the building.

21. A system as set forth in claim 19, wherein the entrant profile includes items typically carried by the entrant.

22. A system as set forth in claim 19, wherein the system includes an alarm that notifies a human operator when an abnormal condition exists.

* * * * *